though this embodiment works in principle in the same way as the embodiment shown in FIGS. 1 and 2.

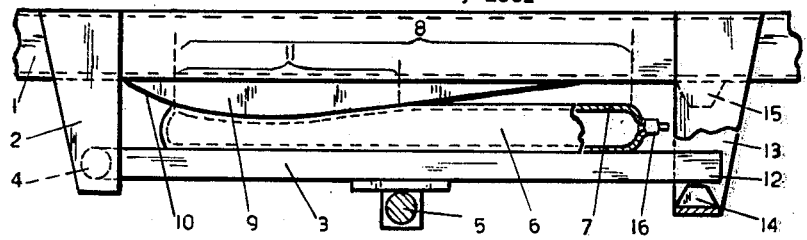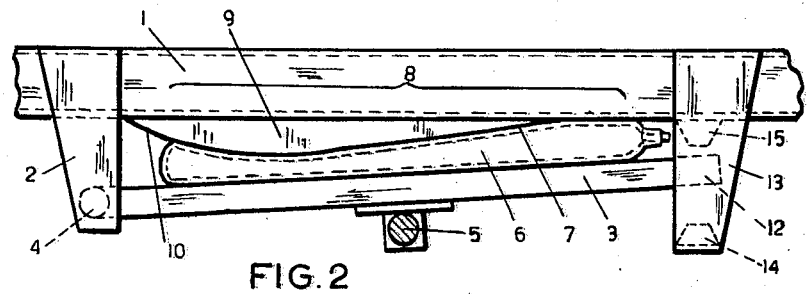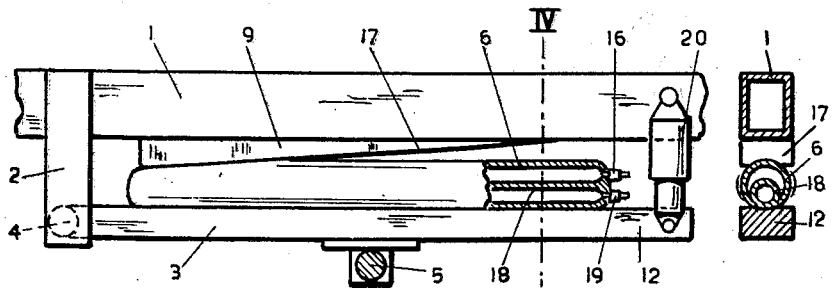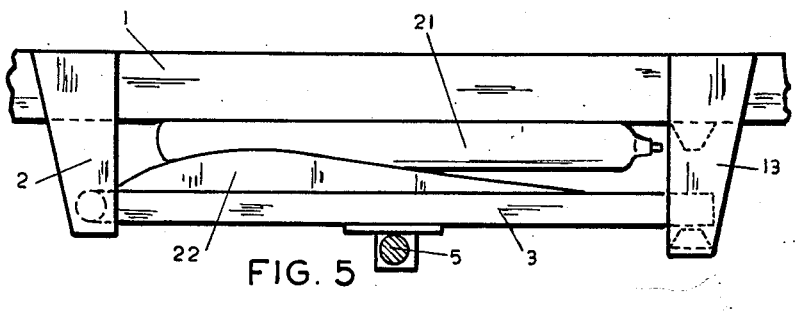

United States Patent Office
3,073,621
AIR SUSPENSION SYSTEMS FOR VEHICLES
Johannes H. Wedzinga, Zwolle, Netherlands, assignor to Van Doorne's Automobielfabriek N.V., Eindhoven, Netherlands
Filed Feb. 2, 1961, Ser. No. 86,611
Claims priority, application Netherlands Feb. 12, 1960
3 Claims. (Cl. 280—124)

The invention relates to an air spring system for vehicles, particularly for vehicle of which the load may vary considerably.

The known air suspension systems are adapted to the load of the vehicle by controlling the pressure of the compressed air in the air filled containers of the suspension system by means of relatively complicated control appliances. Thereby the action, the reliability and the cost price of the known air suspension systems are influenced disadvantageously.

The invention envisages to provide an air suspension system for vehicles, whereby the above mentioned disadvantages are obviated. An air suspension system in accordance with the invention comprises air filled elastic containers and compression members cooperating with said containers and adapted to compress same, said containers and said compression members being so shaped and so mounted for relative movement between the body and the wheels of the vehicle as to permit the contact area between a compression member and the air container cooperating therewith to be varied with and in the same sense as the variation of the load of the vehicle, said contact area being under no-load conditions a fraction, say one third, of the contact area under full-load conditions. In this manner an air suspension system is obtained in a simple and cheap way, which system is operating well during different loads with the desired flexibility, while the characteristic of the spring system shows the desired progression and no complicated control appliances are used.

The simplicity of construction and the well known operation of the air suspension system in accordance with the invention are increased to an important extent, when the air filled elastic containers are entirely closed. These containers need to be filled with air of the correct pressure only one time e.g. when the new vehicle leaves the factory.

Advantageously the air containers of an air suspension system in accordance with the invention have an oblong form and extend in the longitudinal direction of the vehicle body, and the area of said containers permitting said cooperation being formed by a longitudinal wall of the containers.

Possibly one of said air containers is permitted to be partly filled with liquid.

Preferably the area of said compression member permitting said cooperation is formed by the curved surface of a cam.

An air suspension system of excellent construction is obtained when a substantially in longitudinal direction of the vehicle body extending lever is mounted under the air filled containers and the compression members, one end of said lever being pivotally mounted to the vehicle body, at least one of said cooperating parts being fixed to said lever, and support means for the wheels of the vehicle being fitted to said lever on a greater distance of the pivot axis of the lever than the centre of said contact area as to transmit the vertical movements of the wheels to said contact area in a reduced way.

It may further be advantageous when one end of a shock damper is pivotally connected to the other end of said lever, the other end of said shock damper being pivotally mounted to the body of the vehicle.

For the elucidation of the invention reference is made to the accompanying drawing which shows some embodiments.

FIG. 1 is a partly sectional view of an air suspension system in accordance with the invention.

FIG. 2 shows the air suspension system of FIG. 1 in a heavier loaded position partly in sectional view.

FIG. 3 shows a somewhat modified embodiment of an air suspension system in accordance with the invention partly in sectional view.

FIG. 4 is a sectional view taken along the line IV—IV of FIG. 3.

FIG. 5 is a view of still another embodiment of an air suspension system in accordance with the invention.

In FIG. 1 an arm 2, which extends downwards, is fitted to the longitudinal beam 1 of the chassis of the vehicle. One end of a lever 3 is at 4 pivotally mounted to the lower end of the arm 2. A support 5 for the wheels of the vehicle is mounted to the lower side of the lever 3, while the lower wall of a closed oblong container 6, which is filled with compressed air, is fitted to the upper side of the lever 3, of which container the walls are manufactured of elastic material, for example rayon or nylon cord or iron wire with rubber. A cam 9 is mounted to the lower side of the longitudinal beam 1 opposite to the upper wall 7 of the elastic container 6 and cooperating therewith, whereby said upper wall forms the bearing 8 of the air suspension system. A fraction of the partly curved and partly inclined lower surface 10 of the cam 9 contacts the bearing fraction 11 of the bearing 8. The other end 12 of the lever 3 is guided in a second arm 13, which is fixed to the longitudinal beam 1.

Rubber pads 14 and 15 are mounted to the lower and upper end respectively of the arm 13 to limit the stroke of the lever 3. The air container 6 is provided with a valve 16 on the right side in order to be filled with compressed air.

The suspension system is constructed in such way that only a fraction, for example one third, of the bearing 8 of the air suspension system bears under no-load conditions of the vehicle. Under the load condition shown in FIG. 1 the fraction 11 of the bearing 8 bears the load and forms said contact area. When the load increases, the lever 3 is swung upwards about its pivot 4 and a greater part of the bearing 8 contacts the lower surface 10 of the cam 9, as FIG. 2 shows. Under full-load conditions of the vehicle the entire bearing 8 of the suspension system will bear the load, while the lever 3 will contact the pad 15. The support 5 for the wheels of the vehicle is mounted so far to the right side on the lever 3 in the drawing, that vertical movements of the wheels are transmitted in a reduced way to the bearing fraction 11 of the bearing 8.

With the embodiments shown in FIGS. 3 and 4 the lower surface 17 of the cam 9 is not curved, but straight and placed under a corner with the longitudinal beam 1, while a second also entirely closed container 18 is mounted in the first air container 6. The second air container 18 is permitted to be pumped up separately by means of the valve 19 to a higher pressure than the first air container 6, which can be advantageous during extra heavy loads. One end of shock damper 20 is fitted to the end 12 of the lever 3, which shock damper is mounted with its other end to the longitudinal beam 1 of the vehicle body, The embodiment shown in FIG. 5 differs only herein with that of FIGS. 1 and 2, that the air container 21 is fixed to the lower side of the longitudinal beam 1, and that the cam 22 is mounted on the upper side of the lever 3.

Possibly one of the containers 6 or 18 is permitted to be partly filled with liquid.

The invention is not limited to the embodiments described and within the scope of the invention various alterations are possible.

What I claim is:

1. In an air suspension system for vehicles having wheels and having a longitudinally extending body, the load of which may vary considerably; a plurality of first entirely closed, air-filled elastic containers, said containers extending in longitudinal direction of said vehicle body, pivotally mounted levers upon which said containers are mounted, said levers carrying said wheels, and a plurality of compression members extending longitudinally on said vehicle body, said compression members being arranged to cooperate with said containers by compressing same, said compression members having cam-shaped surfaces sloped gradually and extending longitudinally thereof, said surfaces providing variable contact areas between said containers and said compression members, said contact areas increasing and decreasing directly proportionally with increase and decrease of loads, respectively, of said vehicle, and said cam-shaped surfaces having contours for no-load conditions, said contours providing for contact areas under no-load conditions having approximately one-third the size of said contact areas under full load conditions.

2. In an air suspension system for vehicles according to claim 1, comprising second elastic air-filled containers, said second containers being arranged within said first containers, the air in said second containers having a higher pressure than the air in said first containers.

3. In an air suspension system for vehicles according to claim 1, said pivotally mounted levers comprising means for restricting the vertical movement thereof, and having support means for said wheels, said support means being arranged at a greater distance from the pivotal mounting point of said levers than the center of said contact areas of said cam-shaped surfaces of said compression members, whereby the vertical movements of said wheels may be transmitted to said contact areas in reduced proportion.

References Cited in the file of this patent
UNITED STATES PATENTS

| | | |
|---|---|---|
| 2,023,135 | Hawkins | Dec. 3, 1935 |
| 2,115,158 | Dupuy | Apr. 26, 1938 |
| 2,865,652 | Easton | Dec. 23, 1958 |